United States Patent
Chen (10) Patent No.: US 8,442,829 B2
(45) Date of Patent: May 14, 2013

(54) AUTOMATIC COMPUTATION STREAMING PARTITION FOR VOICE RECOGNITION ON MULTIPLE PROCESSORS WITH LIMITED MEMORY

(75) Inventor: Ruxin Chen, Redwood City, CA (US)

(73) Assignee: Sony Computer Entertainment Inc., Tokyo (JP)

(*) Notice: Subject to any disclaimer, the term of this patent is extended or adjusted under 35 U.S.C. 154(b) by 773 days.

(21) Appl. No.: 12/698,955

(22) Filed: Feb. 2, 2010

(65) Prior Publication Data

US 2010/0211391 A1  Aug. 19, 2010

Related U.S. Application Data

(60) Provisional application No. 61/153,264, filed on Feb. 17, 2009.

(51) Int. Cl.
*G10L 15/00*  (2006.01)
(52) U.S. Cl.
USPC .......................... 704/256; 704/251; 369/25.01
(58) Field of Classification Search .................. 704/251, 704/256; 369/25.01
See application file for complete search history.

(56) References Cited

U.S. PATENT DOCUMENTS

| | | | |
|---|---|---|---|
| 4,956,865 A | 9/1990 | Lehnig et al. | 704/241 |
| 4,977,598 A | 12/1990 | Doddington et al. | 704/255 |
| RE33,597 E | 5/1991 | Levinson et al. | 704/256 |
| 5,031,217 A | 7/1991 | Nishimura | 704/256.4 |
| 5,050,215 A | 9/1991 | Nishimura | 704/256.4 |
| 5,129,002 A | 7/1992 | Tsuboka | 704/246 |
| 5,148,489 A | 9/1992 | Erell et al. | 704/226 |
| 5,222,190 A | 6/1993 | Pawate et al. | 704/200 |
| 5,228,087 A | 7/1993 | Bickerton | 704/232 |
| 5,345,536 A | 9/1994 | Hoshimi et al. | 704/243 |
| 5,353,377 A | 10/1994 | Kuroda et al. | 704/256.1 |
| 5,438,630 A | 8/1995 | Chen et al. | 382/159 |

(Continued)

FOREIGN PATENT DOCUMENTS

| EP | 0866442 | 9/1998 |
|---|---|---|
| WO | WO 2004111999 A1 | 12/2004 |

OTHER PUBLICATIONS

Lawrence Rabiner, "A Tutorial on Hidden Markov Models and Selected Application Speech Recognition"—Proceeding of the IEEE, vol. 77, No. 2, Feb. 1989.

(Continued)

*Primary Examiner* — Daniel D Abebe
(74) *Attorney, Agent, or Firm* — Joshua D. Isenberg; JDI Patent (57) ABSTRACT

Speech processing is disclosed for an apparatus having a main processing unit, a memory unit, and one or more co-processors. Memory maintenance and voice recognition result retrievals upon execution are performed with a first main processor thread. Voice detection and initial feature extraction on the raw data are performed with a first co-processor. A second co-processor thread receives feature data derived for one or more features extracted by the first co-processor thread and information for locating probability density functions needed for probability computation by a speech recognition model and computes a probability that the one or more features correspond to a known sub-unit of speech using the probability density functions and the feature data. At least a portion of a path probability that a sequence of sub-units of speech correspond to a known speech unit is computed with a third co-processor thread.

24 Claims, 3 Drawing Sheets

U.S. PATENT DOCUMENTS

| | | | | |
|---|---|---|---|---|
| 5,455,888 A | 10/1995 | Iyengar et al. | | 704/203 |
| 5,459,798 A | 10/1995 | Bailey et al. | | 382/218 |
| 5,473,728 A | 12/1995 | Luginbuhl et al. | | 704/243 |
| 5,502,790 A | 3/1996 | Yi | | 704/256 |
| 5,506,933 A | 4/1996 | Nitta | | 704/256 |
| 5,509,104 A | 4/1996 | Lee et al. | | 704/256 |
| 5,535,305 A | 7/1996 | Acero et al. | | 704/256 |
| 5,581,655 A | 12/1996 | Cohen et al. | | 704/245 |
| 5,602,960 A | 2/1997 | Hon et al. | | 704/207 |
| 5,608,840 A | 3/1997 | Tsuboka | | 704/236 |
| 5,615,296 A | 3/1997 | Stanford et al. | | 704/270.1 |
| 5,617,407 A | 4/1997 | Bareis | | 369/275.3 |
| 5,617,486 A | 4/1997 | Chow et al. | | 382/181 |
| 5,617,509 A | 4/1997 | Kusher et al. | | 704/256 |
| 5,627,939 A | 5/1997 | Huang et al. | | 704/256 |
| 5,649,056 A | 7/1997 | Nitta | | 704/256 |
| 5,649,057 A | 7/1997 | Lee et al. | | 704/256 |
| 5,655,057 A | 8/1997 | Takagi | | 704/233 |
| 5,677,988 A | 10/1997 | Takami et al. | | 704/256 |
| 5,680,506 A | 10/1997 | Kroon et al. | | 704/203 |
| 5,680,510 A | 10/1997 | Hon et al. | | 704/255 |
| 5,719,996 A | 2/1998 | Chang et al. | | 704/256 |
| 5,745,600 A | 4/1998 | Chen et al. | | 382/218 |
| 5,758,023 A | 5/1998 | Bordeaux | | 704/232 |
| 5,787,396 A | 7/1998 | Komori et al. | | 704/256 |
| 5,794,190 A | 8/1998 | Linggard et al. | | 704/232 |
| 5,799,278 A | 8/1998 | Cobbett et al. | | 704/256 |
| 5,812,974 A | 9/1998 | Hemphill et al. | | 704/256.4 |
| 5,825,978 A | 10/1998 | Digalakis et al. | | 704/256 |
| 5,835,890 A | 11/1998 | Matsui et al. | | 704/255 |
| 5,860,062 A | 1/1999 | Taniguchi et al. | | 704/256 |
| 5,880,788 A | 3/1999 | Bregler | | 348/515 |
| 5,890,114 A | 3/1999 | Yi | | 704/256 |
| 5,893,059 A | 4/1999 | Raman | | 704/256.2 |
| 5,903,865 A | 5/1999 | Ishimitsu et al. | | 704/256 |
| 5,907,825 A | 5/1999 | Tzirkel-Hancock | | 704/243 |
| 5,913,193 A | 6/1999 | Huang et al. | | 704/258 |
| 5,930,753 A | 7/1999 | Potamianos et al. | | 704/256.2 |
| 5,937,384 A | 8/1999 | Huang et al. | | 704/256 |
| 5,943,647 A | 8/1999 | Ranta | | 704/251 |
| 5,956,683 A | 9/1999 | Jacobs et al. | | 704/270.1 |
| 5,963,903 A | 10/1999 | Hon et al. | | 704/254 |
| 5,963,906 A | 10/1999 | Turin | | 704/256 |
| 5,983,178 A | 11/1999 | Naito et al. | | 704/245 |
| 5,983,184 A | 11/1999 | Robinson | | 704/254 |
| 5,999,902 A * | 12/1999 | Scahill et al. | | 704/240 |
| 6,009,390 A | 12/1999 | Gupta et al. | | 704/240 |
| 6,009,391 A | 12/1999 | Asghar et al. | | 704/243 |
| 6,023,677 A | 2/2000 | Class et al. | | 704/254 |
| 6,035,271 A | 3/2000 | Chen | | 704/207 |
| 6,061,652 A | 5/2000 | Tsuboka et al. | | 704/245 |
| 6,067,520 A | 5/2000 | Lee | | 704/270 |
| 6,078,884 A | 6/2000 | Downey | | 704/243 |
| 6,092,042 A | 7/2000 | Iso | | 704/240 |
| 6,112,175 A | 8/2000 | Chengalvarayan | | 704/256.5 |
| 6,138,095 A | 10/2000 | Gupta et al. | | 704/234 |
| 6,138,097 A | 10/2000 | Lockwood et al. | | 704/256.2 |
| 6,148,284 A | 11/2000 | Saul | | 704/256.4 |
| 6,151,573 A | 11/2000 | Gong | | 704/256.2 |
| 6,151,574 A | 11/2000 | Lee et al. | | 704/256 |
| 6,188,982 B1 | 2/2001 | Chiang | | 704/256.5 |
| 6,223,159 B1 | 4/2001 | Ishii | | 704/256.7 |
| 6,226,612 B1 | 5/2001 | Srenger et al. | | 704/256.2 |
| 6,236,963 B1 | 5/2001 | Naito et al. | | 704/241 |
| 6,246,980 B1 | 6/2001 | Glorion et al. | | 704/231 |
| 6,253,180 B1 | 6/2001 | Iso | | 704/244 |
| 6,256,607 B1 | 7/2001 | Digalakis et al. | | 704/222 |
| 6,292,776 B1 | 9/2001 | Chengalvarayan | | 704/256 |
| 6,405,168 B1 | 6/2002 | Bayya et al. | | 704/256 |
| 6,415,256 B1 | 7/2002 | Ditzik | | 704/231 |
| 6,442,519 B1 | 8/2002 | Kanevsky et al. | | 704/243 |
| 6,446,039 B1 | 9/2002 | Miyazawa et al. | | 704/256 |
| 6,456,965 B1 | 9/2002 | Yeldener | | 704/207 |
| 6,526,380 B1 | 2/2003 | Thelen et al. | | 704/251 |
| 6,593,956 B1 | 7/2003 | Potts et al. | | 348/14.09 |
| 6,629,073 B1 | 9/2003 | Hon et al. | | 704/256.4 |
| 6,662,160 B1 | 12/2003 | Chien et al. | | 704/256 |
| 6,671,666 B1 | 12/2003 | Ponting et al. | | 704/233 |
| 6,671,668 B2 | 12/2003 | Harris | | 704/246 |
| 6,671,669 B1 | 12/2003 | Garudadri et al. | | 704/255 |
| 6,681,207 B2 | 1/2004 | Garudadri | | 704/256 |
| 6,721,699 B2 | 4/2004 | Xu et al. | | 704/207 |
| 6,757,652 B1 | 6/2004 | Lund et al. | | 704/254 |
| 6,801,892 B2 | 10/2004 | Yamamoto | | 704/256 |
| 6,832,190 B1 | 12/2004 | Junkawitsch et al. | | 704/255 |
| 6,868,382 B2 | 3/2005 | Shozakai | | 704/254 |
| 6,901,365 B2 | 5/2005 | Miyazawa | | 704/256 |
| 6,907,398 B2 | 6/2005 | Hoege | | 704/265 |
| 6,934,681 B1 | 8/2005 | Emori et al. | | 704/250 |
| 6,963,836 B2 | 11/2005 | Van Gestel | | 704/251 |
| 6,980,952 B1 | 12/2005 | Gong | | 704/234 |
| 7,003,460 B1 | 2/2006 | Bub et al. | | 704/256 |
| 7,133,535 B2 | 11/2006 | Huang et al. | | 382/100 |
| 7,139,707 B2 | 11/2006 | Sheikhzadeh-Nadjar et al. | | 704/243 |
| 7,269,556 B2 | 9/2007 | Kiss et al. | | 704/245 |
| 7,328,153 B2 * | 2/2008 | Wells et al. | | 704/231 |
| 7,979,277 B2 * | 7/2011 | Larri et al. | | 704/238 |
| 2001/0041978 A1 * | 11/2001 | Crespo et al. | | 704/257 |
| 2002/0116196 A1 | 8/2002 | Tran | | 704/270 |
| 2003/0033145 A1 | 2/2003 | Petrushin | | 704/236 |
| 2003/0177006 A1 | 9/2003 | Ichikawa et al. | | 704/231 |
| 2004/0059576 A1 | 3/2004 | Lucke | | 704/256.7 |
| 2004/0078195 A1 | 4/2004 | Oda et al. | | 704/207 |
| 2004/0088163 A1 | 5/2004 | Schalkwyk | | 704/251 |
| 2004/0220804 A1 | 11/2004 | Odell | | 704/230 |
| 2005/0010408 A1 | 1/2005 | Nakagawa et al. | | 704/240 |
| 2005/0038655 A1 | 2/2005 | Mutel et al. | | 704/256 |
| 2005/0065789 A1 | 3/2005 | Yacoub et al. | | 704/231 |
| 2005/0075887 A1 * | 4/2005 | Bernard et al. | | 704/277 |
| 2005/0159952 A1 * | 7/2005 | Nguyen et al. | | 704/243 |
| 2005/0286705 A1 | 12/2005 | Contolini et al. | | 379/265.02 |
| 2006/0020462 A1 | 1/2006 | Reich | | 704/254 |
| 2006/0031069 A1 | 2/2006 | Huang et al. | | 704/243 |
| 2006/0031070 A1 | 2/2006 | Abrego et al. | | 704/243 |
| 2006/0178876 A1 | 8/2006 | Sato et al. | | 704/225 |
| 2006/0224384 A1 | 10/2006 | Dow et al. | | 704/257 |
| 2006/0229864 A1 | 10/2006 | Suontausta et al. | | 704/8 |
| 2006/0277032 A1 | 12/2006 | Hernandez-Abrego et al. | | 704/9 |
| 2007/0112566 A1 | 5/2007 | Chen | | 704/240 |
| 2007/0198261 A1 | 8/2007 | Chen | | 704/240 |
| 2007/0198263 A1 | 8/2007 | Chen | | 704/246 |
| 2008/0052062 A1 | 2/2008 | Stanford | | 704/8 |
| 2009/0024720 A1 | 1/2009 | Karray et al. | | 709/219 |

OTHER PUBLICATIONS

Steven B. Davis et al., "Comparison of Parametric Representations for Monosyllabic Word Recognition in Continuously Spoken Sentences"—IEEE Transactions on Acoustics, Speech, and Signal Processing, vol. ASSP 28, No. 4, p. 357-366, Aug. 1980.

G. David Forney, Jr., "The Viterbi Agorithm"—Proceeding of the IEEE, vol. 61, No. 3, p. 268-278, Mar. 1973.

Kai-Fu Lee et al., "Speaker-Independent phone Recognition Using Hidden Markov Models"—IEEE Transaction in Acoustics, Speech, and Signal Processing, vol. 37, No. 11, p. 1641-1648, Nov. 1989.

Hans Werner Strube, "Linear Prediction on a Warped Frequency Scale,"—The Journal of the Acoustical Society of America, vol. 68, No. 4, p. 1071-1076, Oct. 1980.

Leonard E. Baum et al., "A Maximization Technique Occurring in the Statistical Analysis of Probabilistic Functions of Markov Chains,"—The Annals of Mathematical Statistics, vol. 41, No. 1, p. 164-171, Feb. 1970.

Rohit Sinha et al., "Non-Uniform Scaling Based Speaker Normalization" 2002 IEEE, May 13, 2002, vol. 4, pp. I-589-I-592.

Li Lee et al., "Speaker Normalization Using Efficient Frequency Warping Procedures" 1996 IEEE, vol. 1, pp. 353-356.

Vasilache, "Speech recognition Using HMMs With Quantized Parameters", Oct. 2000, 6$^{th}$ International Conference on Spoken Language Processing (ICSLP 2000), pp. 1-4.

Bocchieri, "Vector Quantization for the Efficient Computation of Continuous Density Likelihoods", Apr. 1993, International conference on Acoustics, Speech, and Signal Processing, IEEE, pp. 692-695.

Claes et al. "A Novel Feature Transformation for Vocal Tract Length Normalization in Automatic Speech Recognition", IEEE Transformations on Speech and Audio Processing, vol. 6, 1998, pp. 549-557.

M. Tamura et al. "Adaptation of Pitch and Spectrum for HMM-Based Speech Synthesis Using MLLR", proc of ICASSP 2001, vl. 1, pp. 1-1, May 2001.

Cherif A, "Pitch and Formants Extraction Algorithm for Speech Processing," Electronics, Circuits and Systems, 2000, ICECS 2000. The 7th IEEE International Conference on vol. 1, Dec. 17-20, 2000, pp. 595-598, vol. 1.

L. Lee, R. C. Rose, "A frequency warping approach to speaker normalization," in IEEE Transactions on Speech and Audio Processing, vol. 6, No. 1, pp. 49-60, Jan. 1998.

W. H. Abdulla and N. K. Kasabov. 2001. Improving speech recognition performance through gender separation. In Proceedings of ANNES, pp. 218-222.

Iseli, M., Y. Shue, and A. Alwan (2006). Age- and Gender-Dependent Analysis of Voice Source Characteristics, Proc. ICASSP, Toulouse.

"Cell Broadband Engine Architecture", copyright International Business Machines Corporation, Sony Computer Entertainment Incorporated, Toshiba Corporation Aug. 8, 2005, which may be downloaded at http://cell.scei.co.jp/.

U.S. Appl. No. 61/153,264 entitled "Automatic Computation Streaming Partition for Voice Recognition on Multiple Processors With Limited Memory", filed Feb. 17, 2009.

International Search Report and Written Opinion dated Mar. 19, 2010 issued for International Application PCT/US10/23098.

International Search Report and Written Opinion dated Mar. 22, 2010 issued for International Application PCT/US10/23102.

International Search Report and Written Opinion dated Apr. 5, 2010 issued for International Application PCT/US10/23105.

* cited by examiner

AUTOMATIC COMPUTATION STREAMING PARTITION FOR VOICE RECOGNITION ON MULTIPLE PROCESSORS WITH LIMITED MEMORY

FIELD OF INVENTION

Embodiments of the present invention relate generally to computer-implemented voice recognition, and more particularly, to a method and apparatus that estimates a distance and direction to a speaker based on input from two or more microphones.

BACKGROUND OF INVENTION

A speech recognition system receives an audio stream and filters the audio stream to extract and isolate sound segments that make up speech. Speech recognition technologies allow computers and other electronic devices equipped with a source of sound input, such as a microphone, to interpret human speech, e.g., for transcription or as an alternative method of interacting with a computer. Speech recognition software has been developed for use in consumer electronic devices such as mobile telephones, game platforms, personal computers and personal digital assistants.

In a typical speech recognition algorithm, a time domain signal representing human speech is broken into a number of time windows, sometimes referred to as frames, and the time domain signal for each frame is converted to a frequency domain signal, e.g., by fast Fourier transform (FFT). This frequency or spectral domain signal is then compressed by taking a logarithm of the spectral domain signal and then performing another FFT. From the compressed signal, a statistical model can be used to determine phonemes and context within the speech represented by the signal. The extracted phonemes and context may be compared to stored entries in a database to determine the word or words that have been spoken.

A speech recognition system may utilize a grammar and dictionary (GnD) organized as a connected graph structure to analyze one or more frames. The graph structure generally includes a plurality of interconnected nodes that correspond to phonemes and terminal points that correspond to words in the GnD. Signals from one or more frames are analyzed by traversing a path through a subset of the nodes to a word.

Speech recognition systems often use a Hidden Markov Model (HMM) at each node within such a graph structure to determine the units of speech in a given speech signal. The speech units may be words, two-word combinations or sub-word units, such as phonemes and the like. Each HMM is a grouping of HMM states that represent a phoneme under a context. By way of example, the context may indicate a preceding or subsequent phoneme extracted from the time domain signal. Each HMM state is a mixture of probability distributions (e.g., Gaussians). Each node is further characterized by an HMM structure that includes a link and a transition probability for each of the HMM states. The combination of HMMs, states, Gaussians and HMM structure for each node in the GnD is sometimes referred to herein as an acoustic model.

The HMM may be characterized by:

L, which represents a number of possible states of the system;
M, which represents the total number of Gaussians that exist in the system;
N, which represents the number of distinct observable features at a given time; these features may be spectral (i.e., frequency domain) or temporal (time domain) features of the speech signal;
$A=\{a_{ij}\}$, a state transition probability distribution, where each $a_{ij}$ represents the probability that the system will transition to the $j^{th}$ state at time t+1 if the system is initially in the $i^{th}$ state at time t;
$B=\{b_j(k)\}$, an observation feature probability distribution for the $j^{th}$ state, where each $b_j(k)$ represents the probability distribution for observed values of the $k^{th}$ feature when the system is in the $j^{th}$ state; and
$\pi=\{\pi_i\}$, an initial state distribution, where each component $\pi_i$ represents the probability that the system will be in the $i^{th}$ state at some initial time.

Hidden Markov Models can solve three basic problems of interest in real world applications, such as speech recognition: (1) Given a sequence of observations of a system, how can one efficiently compute the probability of the observation sequence; (2) given the observation sequence, what corresponding state sequence best explains the observation sequence; and (3) how can one adjust the set of model parameters A, B π to maximize the probability of a given observation sequence.

The application of HMMs to speech recognition is described in detail, e.g., by Lawrence Rabiner in "A Tutorial on Hidden Markov Models and Selected Applications in Speech Recognition" in Proceedings of the IEEE, Vol. 77, No. 2, February 1989, which is incorporated herein by reference in its entirety for all purposes. Human speech can be characterized by a number of recognizable patterns known as phonemes. Each of these phonemes can be broken down in a number of parts, e.g., a beginning, middle and ending part. It is noted that the middle part is typically the most stable since the beginning part is often affected by the preceding phoneme and the ending part is affected by the following phoneme. The different parts of the phonemes are characterized by frequency domain features that can be recognized by appropriate statistical analysis of the signal. The statistical model often uses Gaussian probability distribution functions to predict the probability for each different state of the features that make up portions of the signal that correspond to different parts of different phonemes. One HMM state can contain one or more Gaussians. A particular Gaussian for a given possible state, e.g., the $k^{th}$ Gaussian can be represented by a set of N mean values $\mu_{ki}$ and variances $\sigma_{ki}$. In a typical speech recognition algorithm one determines which of the Gaussians for a given time window is the largest one. From the largest Gaussian one can infer the most probable phoneme for the frame.

Each node in the graph structure corresponds to a phoneme. The HMM, Gaussians, state and HMM structure are used the compute the probability that a measured feature set for a frame corresponds to the phoneme for the node for a given frame. Given the probabilities for each node at each frame probabilities are then computed for possible paths through linked nodes in the GnD that lead to words or phrases. The path having the highest probability is determined selected in order to complete the recognition.

Voice recognition accesses large amount of data in random fashion. The voice recognition graph memory structure is not easily partitioned into un-related memory blocks so that computation can be done in parallel in co-processors having a relatively small local memory (e.g., 256 kilobytes). Prior art voice recognition systems used either a single big chunk of main memory in a PC environment or ran on embedded devices with a smaller size HMM and smaller vocabulary.

It is within this context that embodiments of the current invention arise.

DESCRIPTION OF THE SPECIFIC EMBODIMENTS

Voice recognition typically involves tasks requiring a large range of memory sizes. By restructuring the execution flow, it is possible to parallelize the voice recognition process to run on parallel co-processors with limited local memory.

Embodiments of the present invention enable a parallel processing system to run voice recognition using large memory size HMM and large vocabulary using comparatively very limited memory co-processors. During initialization, an estimation may be performed to decide how to partition a voice recognition computation among different co-processors. After initialization, voice recognition may be carried out using multiple co-processor and main processor threads.

Figure 1:
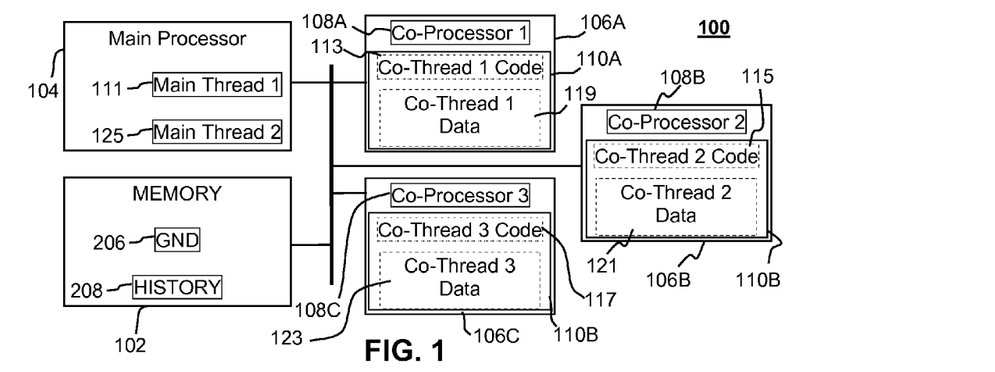
FIG. 1 is a block diagram illustrating a speech processing system according to an embodiment of the present invention.

As seen in FIG. 1, a voice recognition system 100 may generally include a memory unit 102, a main processing unit 104, and one or more co-processor elements 106A, 106B, 106C. These components may be coupled to each other, e.g., via a data bus. The memory unit 102 may include any type of addressable computer memory, e.g., RAM, DRAM, and the like. The main processor unit 104 may be a general-purpose processing unit, which can access system management resources (such as memory-protection tables, for example). Hardware resources may be mapped explicitly to a real address space as seen by the main processor unit. Therefore, the main processor unit 104 may address any of these resources directly by using an appropriate effective address value. A primary function of the main processor unit 104 is management and allocation of tasks for the co-processor elements in the system 100. By way of example, and not by way of limitation, the main processor element 104 may be a 64-bit PowerPC Processor Units with associated caches.

Each of the co-processor elements 106A, 106B, 106C includes a co-processor unit 108A, 108B, 108C and an associated local memory 110A, 110B, 110C. The capacity of each local memory is relatively small compared to the memory capacity of the memory unit 102. By way of example, the memory unit 102 may have a capacity of several tens of megabytes and the local memories 110A, 110B, 110C may have a memory capacity of only a few hundred kilobytes. However, because the local memories are associated with corresponding co-processor units 108A, 108B, 108C, the co-processor units can access the local memories 110A, 110B, 110C much faster than they can access the main memory unit 102.

The co-processor units 108A, 108B, 108C may be less complex computational units than the main processor unit 104. Specifically, unlike the main processor unit 104, the co-processor units need not be configured perform any system management functions. The co-processor units 108A, 108B, 108C may generally have a single instruction, multiple data (SIMD) capability and may process data and initiate any required data transfers in order to perform their allocated tasks (subject to access properties set up by the main processor unit 104). The co-processor units 108A, 108B, 108C enable applications that require a higher computational unit density and can effectively use the provided instruction set. A significant number of co-processor elements in the system 100, managed by the main processor 104, allows for cost-effective speech processing over a wide range of applications.

The system 100 may implement voice recognition process in the form of multiple software threads executed by the main processor 104 and one or more of the co-processors 106A, 106B, 106C. Specifically, one or more main processor threads 111, 125 may be stored in the memory unit 102 and configured for execution by the main processor 104.

Furthermore, first, second and third co-processor threads may be implemented by one or more of the co-processors 106A, 106B, 106C. Specifically, code 113, 115, 117 and data 119, 121, 123 corresponding to these threads may be loaded into the local memories 110A, 110B, 110C of the co-processor elements 106A, 106B, 106C. The co-processor units 108A, 108B, 108C may execute the co-processor thread code 113, 115, 117 in parallel with a first main processor thread 111. The co-processor thread codes 113, 115, 117 may be stored in the memory unit 102 and transferred to the local stores of one or more of the co-processor elements as needed. In the example depicted in FIG. 1, separate threads are depicted and described as running on separate co-processor units for the sake of simplicity of illustration. However, this is not a strict requirement of any embodiment of the present invention. For example, two or more threads may run on a single co-processor. Alternatively, execution of a given co-processor thread may be split amongst two or more co-processors.

Figure 2:
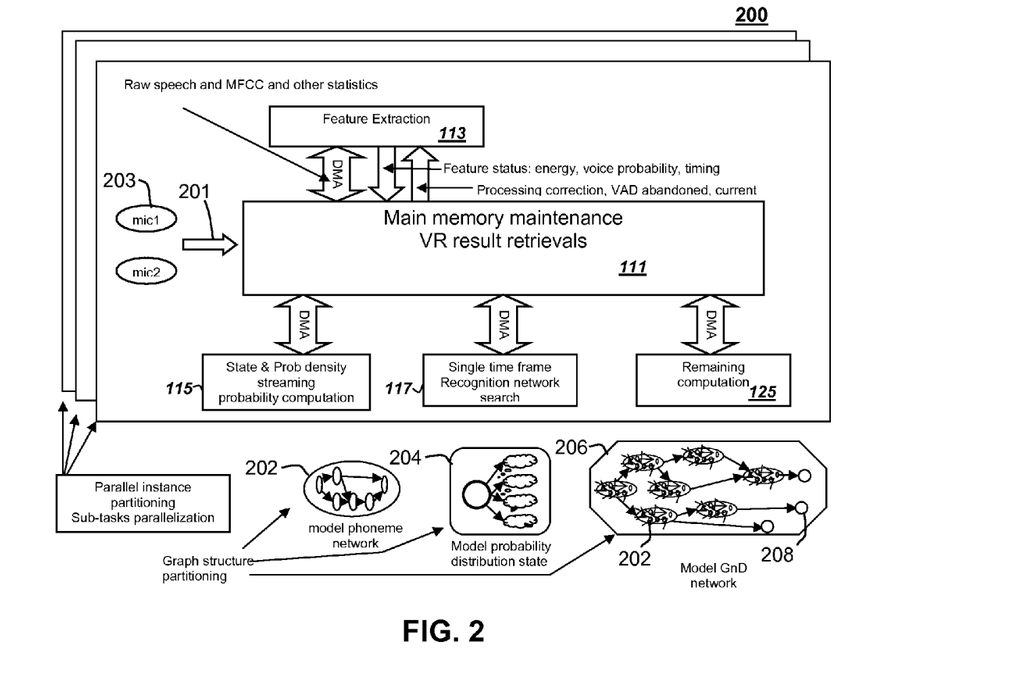
FIG. 2 is a diagram illustrating a process flow for a speech processing method in accordance with an embodiment of the present invention.

Operation of the system 100 may be understood by referring to FIG. 1 and FIG. 2. As illustrated in FIG. 2, a computer implemented speech processing method 200 may implement speech recognition broken down into the following tasks. An input sound signal 201 may be analyzed to determine whether it contains features corresponding to sounds of speech. These features may be extracted from the signal for one or more time windows. The set of features for each time window may be compared against a set of predetermined states of each of a plurality of speech recognition models 202. By way of example, and not by way of limitation, each model may be a Hidden Markov Model (HMM). Each recognition model 202 may correspond to a particular unit or sub-unit of speech. Each recognition model 202 may use a set of probability density functions 204 to determine a probability that a particular feature or set of features corresponds to one or more given states 204 within the model 202. By way of example, and not by way of limitation, the probability density functions may be Gaussian probability density functions. States within the model 202 may be linked to each other via transition probabilities in a model structure. Computations are performed to determine the probability that a given model 202 explains the observed set of features.

The models 202 are linked to each other in a network 206, sometimes referred to as a grammar and dictionary (GnD). Data corresponding to the network 206 may be stored in the main memory 102. Each node in the network may include one or more models corresponding to particular speech sub-unites, e.g., phonemes. Paths among the linked nodes lead to different predetermined speech units (e.g., words or phrases)

within the GnD 206. Each link between two nodes may include a probability that one node follows the other. Once a probability has been determined for each model 202, path probabilities may be computed for each potential path through the network 206. The probabilities for each model at each node in a path and the links between neighboring nodes in a given path may be taken into account in determining the probability for the path. The path having the maximum probability may then be determined to recognize a word in the GnD 206.

As seen in FIG. 2, the tasks described above may be implemented in a parallelized by the main processor thread and the first, second and third co-processor threads. In addition, implementation of all of these tasks may be parallelized further using parallel instance partitioning.

By way of example, the first main processor thread 111 may be configured to cause the main processor 104 to perform memory maintenance and voice recognition result retrievals upon execution. For example, in some embodiments, the first main processor thread 111 may be further configured to receive the raw data and buffer the raw data for transfer to the first co-processor element 106A for computations performed by the first co-processor thread code 113.

The first co-processor thread code 113 may be configured to cause one or more of the co-processors to receive the raw data 201 representing sound detected by one or more microphones 203 and perform voice detection, initial feature extraction on the raw data, and some rough broader class phoneme classification of the raw data. Specifically, the first co-processor thread data 119 may include raw data representing a time domain sound signal over a period of time referred to as a frame. The first co-processor thread code 113 may cause the first co-processor unit 108A to analyze the frequency content of the time signal to determine if the signal contains frequencies corresponding to speech and to extract one or more features of the signal. By way of example, the code 113 may cause the processor unit 108A to compute mel frequency cepstrum coefficients (MFCCs) and/or other statistics for the signal data 119. The results of these computations, e.g., feature status, energy, voice probability and timing information may be transferred back to the main memory 102 for further handling by the first main processor thread 111.

In some embodiments, the first main processor thread 111 may be further configured to finish feature extraction from initial feature extraction performed by the first co-processor thread. The resulting features may be sent to the second co-processor element 106B for processing with the second co-processor thread code 115.

A second co-processor element 106B may execute the second co-processor thread code 115. The second co-processor thread code 115 may be configured to cause the second co-processor element 106B to receive feature data derived for one or more features extracted by the first co-processor thread. This data may be stored in the local store 110B as part of the second co-processor thread data 121. The code 115 may also cause the co-processor to receive information for locating probability density functions needed for probability computation by a speech recognition model. When executed, the second co-processor thread code 115 may compute a probability that one or more features correspond to a known sub-unit of speech using the probability density functions and the feature data stored in the local store 110B.

In some embodiments, the second co-processor thread may be further configured to receive code and data for retrieving a state and probability density from the main memory 102 in order to determine a most probable sub-unit of speech.

In some embodiments, the second co-processor thread may be executed by two co-processors. One first co-processor may compute the probability for the sub-unit and a second co-processor determines the most probable states within the model.

The results of the probability computation produced by the second co-processor thread may be stored in the memory unit 102 by the main processor thread 111 and subsequently transferred to a third co-processor element 106C for processing with the third co-processor thread code 117. Upon execution, the third co-processor thread code 117 may use one or more of the probabilities from the second co-processor thread to compute at least a portion of a path probability. The path probability is a probability that sequence of sub-units of speech (e.g., phonemes) correspond to a known speech unit (e.g., a word or phrase). In terms of the GnD network 206 this corresponds to the probability for a path through the GnD network 206.

According to embodiments of the present invention if a decision to be made during voice recognition involves a small enough number of recognition models all the necessary code and data 123 for making that decision can fit into a single co-processor local memory. For example, the local memory 110C for the third co-processor element 106C may have sufficient memory available for the third co-processor thread code 117 to load all network probabilities for given network of speech sub-units for a given sub-unit probability.

Alternatively, the third co-processor thread may be configured to load data 123 for a single node (e.g., a speech sub-unit such as a phoneme) associated with the node plus links to one or more neighboring nodes into the local memory 110C along with a complete model structure for the node and all state probabilities for a corresponding model.

Any remaining computation necessary for word recognition that is not handled by the first main processor thread or the first, second and third co-processor threads may be handled by a second main processor thread 125. By way of example, the second main processor thread 125 may determine the maximum path probability from among multiple possible path probabilities and correlate the path with the maximum probability to a recognized word.

In some embodiments, the third co-processor thread may be configured to compute one or more per node per frame portions of the path probability. In such a case, the second main processor thread 125 may be configured to collect the per node per frame portions probabilities from the third co-processor thread and keep track of a history 208 of the per-node-per-frame portions. The second main processor thread may also determine the path probability from the history of the per-node-per-frame portions computed by the third co-processor thread.

The third co-processor thread may alternatively be configured to compute a complete per-frame path probability. In such a case, the second main processor thread may be configured to keep track of a history of the relevant paths and the per-frame path probabilities computed by the third co-processor thread.

Figure 3:
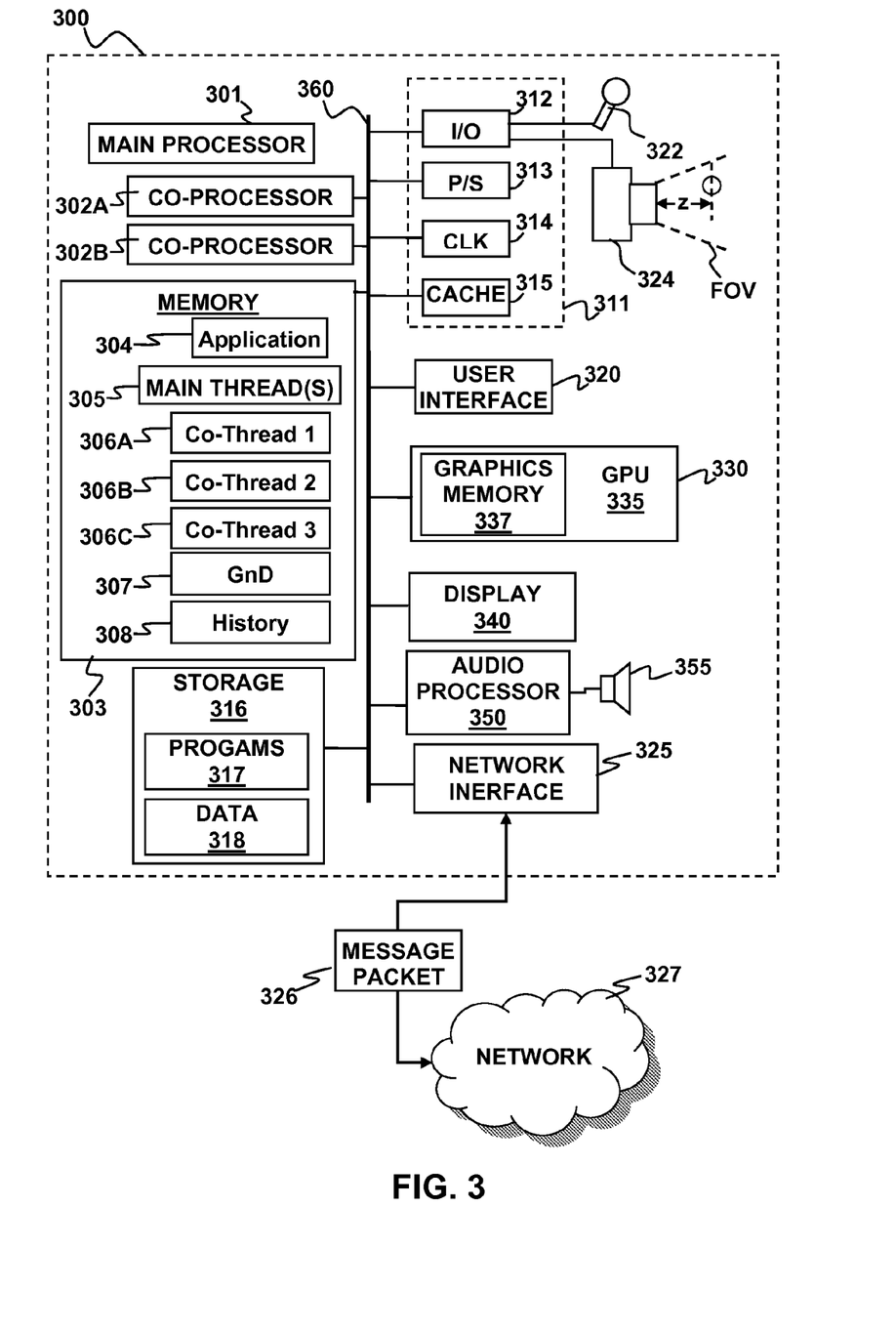
FIG. 3 is a block diagram of a speech processing apparatus according to an embodiment of the present invention.

A speech processing apparatus may be configured in accordance with embodiments of the present invention in any of a number of ways. By way of example, FIG. 3 is a more detailed block diagram illustrating a speech processing apparatus 300 according to an embodiment of the present invention. By way of example, and without loss of generality, the apparatus 300 may be implemented as part of a computer system, such as a personal computer, video game console, personal digital assistant, cellular telephone, hand-held gaming device, portable internet device or other digital device. In a preferred embodiment, the apparatus is implemented as part of a video game console.

The apparatus 300 generally includes at least one main processing unit 301, one or more co-processor elements 302A, 302B and a memory unit 303. Each co-processor element may have a processor unit and an associated local memory. The apparatus 300 may also include well-known support functions 311, such as input/output (I/O) elements 312, power supplies (P/S) 313, a clock (CLK) 314 and cache 315. The apparatus 300 may further include a storage device 316 that provides non-volatile storage for software instructions 317 and data 318. By way of example, the storage device 316 may be a fixed disk drive, removable disk drive, flash memory device, tape drive, CD-ROM, DVD-ROM, Blu-ray, HD-DVD, UMD, or other optical storage devices.

The processing unit 301 may include one or more processing cores. By way of example and without limitation, the main processing unit 301 and co-processor elements 302A, 302B may be part of a parallel processor module, such as a Cell Processor. An example of a Cell Processor architecture is described in detail, e.g., in *Cell Broadband Engine Architecture*, copyright International Business Machines Corporation, Sony Computer Entertainment Incorporated, Toshiba Corporation Aug. 8, 2005 a copy of which may be downloaded at http://cell.scei.co.jp/, the entire contents of which are incorporated herein by reference.

In a Cell Processor architecture, the computational unit corresponding to the processing unit 301 is referred to as a "Power Processing Element" (PPE) and the computational units corresponding to the co-processor elements 302A, 302B are referred to as "Synergistic Processing Elements" (SPE). It is noted that a Cell Processor architecture is but one example, among others, of a suitable processor architecture that may be used with embodiments of the invention. However, embodiments of the present invention may be implemented using other multi-processor architectures.

The memory unit 303 may be any suitable medium for storing information in computer readable form. By way of example, and not by way of limitation, the memory unit 303 may include random access memory (RAM) or read only memory (ROM), a computer readable storage disk for a fixed disk drive (e.g., a hard disk drive), or a removable disk drive.

The main processing unit 301 and co-processors 302A, 302B may be configured to run software applications and optionally an operating system. Portions of such software applications may be stored in the memory unit 303. Instructions and data may be loaded into registers of the main processing unit 301 or local stores of the co-processor elements 302A, 302B for execution. The software applications may include a main application 303, such as a video game application. The main application 304 may operate in conjunction speech processing software configured to operate as described above with respect to FIG. 1 and FIG. 2. Such software may include one or more main processor threads 305, first, second, and third co-processor threads 306A, 306B, 306C. In addition data associated with the speech processing software, e.g., a GnD 307, and history data 308, portions of all of which may be stored in the memory 302 and loaded into registers of the main processing unit 301 or local stores of the co-processor elements 302A, 302B as necessary.

Through appropriate configuration of the foregoing components, the main processor 301 and co-processors 302A, 302B may be configured to implement the speech processing operations described above with respect to FIG. 1 and FIG. 2. Specifically, the main memory thread(s) 305 may perform memory maintenance and voice recognition result retrievals.

The main memory thread(s) may trigger the application 304 to change a state of the apparatus 300 when a word is recognized. As used herein, a "change of state" refers to a change in the operation of the apparatus. By way of example, a change of state may include execution of a command or selection of particular data for use by another process handled by the application 304. A non-limiting example of execution of a command would be for the apparatus to begin the process of selecting a song upon recognition of the word "select". A non-limiting example of selection of data for use by another process would be for the process to select a particular song for play when the input phoneme set matches the title of the song.

The first co-processor thread 306A may receive the raw data representing sound detected by one or more microphones 322 and perform voice detection and initial feature extraction on the raw data.

The second co-processor thread 306B may receive feature data derived for one or more features extracted by the first co-processor thread and also receive information for locating probability density functions needed for probability computation by a speech recognition model. The second co-processor thread uses this data to compute a probability that one or more features correspond to a known sub-unit of speech using the probability density functions.

The results of the probability computation produced by the second co-processor thread 306B may be stored in the memory unit 303 by the main processor thread 305, e.g., as part of the history data 308. The third co-processor thread 306C may use one or more of the probabilities from the second co-processor thread 306B to compute at least a portion of a path probability for a path through the GnD 307.

The apparatus 300 may include a network interface 325 to facilitate communication via an electronic communications network 327. The network interface 325 may be configured to implement wired or wireless communication over local area networks and wide area networks such as the Internet. The system 300 may send and receive data and/or requests for files via one or more message packets 326 over the network 327.

The apparatus 300 may further comprise a graphics subsystem 330, which may include a graphics processing unit (GPU) 335 and graphics memory 337. The graphics memory 337 may include a display memory (e.g., a frame buffer) used for storing pixel data for each pixel of an output image. The graphics memory 337 may be integrated in the same device as the GPU 335, connected as a separate device with GPU 335, and/or implemented within the memory unit 302. Pixel data may be provided to the graphics memory 337 directly from the processing unit 301. In some embodiments, the graphics unit may receive a video signal data extracted from a digital broadcast signal decoded by a decoder (not shown). Alternatively, the processing unit 301 may provide the GPU 335 with data and/or instructions defining the desired output images, from which the GPU 335 may generate the pixel data of one or more output images. The data and/or instructions defining the desired output images may be stored in memory 302 and/or graphics memory 337. In an embodiment, the GPU 335 may be configured (e.g., by suitable programming or hardware configuration) with 3D rendering capabilities for generating pixel data for output images from instructions and data defining the geometry, lighting, shading, texturing, motion, and/or camera parameters for a scene. The GPU 335 may further include one or more programmable execution units capable of executing shader programs.

The graphics subsystem 330 may periodically output pixel data for an image from the graphics memory 337 to be displayed on a video display device 340. The video display device 350 may be any device capable of displaying visual information in response to a signal from the apparatus 300, including CRT, LCD, plasma, and OLED displays that can display text, numerals, graphical symbols or images. The digital broadcast receiving device 300 may provide the display device 340 with a display driving signal in analog or digital form, depending on the type of display device. In addition, the display 340 may be complemented by one or more audio speakers that produce audible or otherwise detectable sounds. To facilitate generation of such sounds, the apparatus 300 may further include an audio processor 350 adapted to generate analog or digital audio output from instructions and/or data provided by the processing unit 301, memory unit 302, and/or storage 316. The audio output may be converted to audible sounds, e.g., by a speaker 355.

The components of the apparatus 300, including the main processing unit 301, co-processor elements 302A, 302B, support functions 311, data storage 316, user input devices 320, network interface 325, graphics subsystem 330 and audio processor 350 may be operably connected to each other via one or more data buses 360. These components may be implemented in hardware, software or firmware or some combination of two or more of these.

Embodiments of the present invention are usable with applications or systems that utilize a camera, which may be a depth camera, sometimes also known as a 3D camera or zed camera. By way of example, and not by way of limitation, the apparatus 300 may optionally include a camera 324, which may be a depth camera, which, like the microphone 322, may be coupled to the data bus via the I/O functions. The main application 304 may analyze images obtained with the camera to determine information relating to the location of persons or objects within a field of view FOV of the camera 324. The location information can include a depth z of such persons or objects. The main application 304 may use the location information in conjunction with speech processing as described above to obtain inputs.

Figure 4:
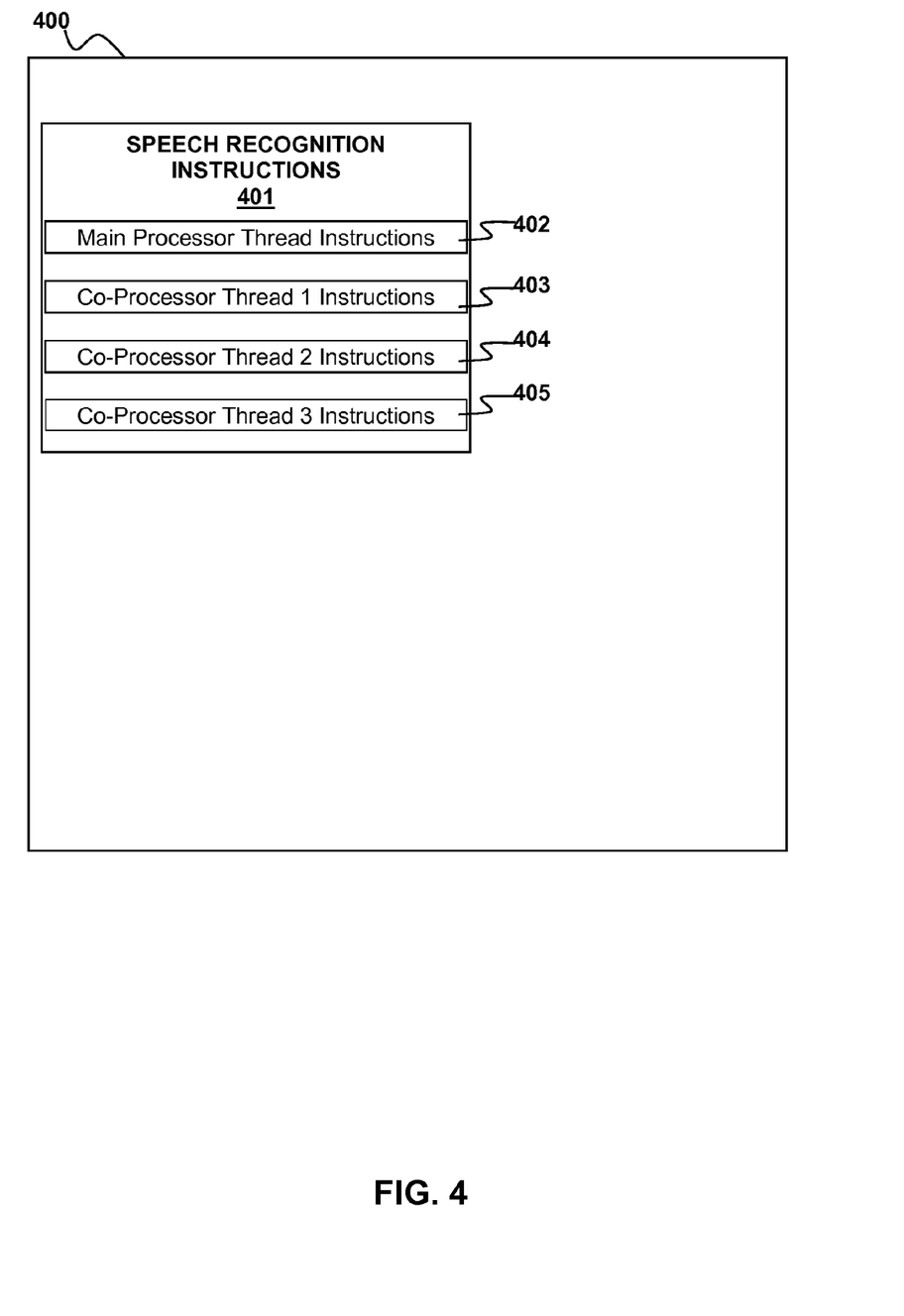
FIG. 4 is a block diagram of a computer readable medium containing computer readable instructions for implementing speech processing in accordance with an embodiment of the present invention.

According to another embodiment, instructions for carrying out speech processing as described above may be stored in a computer readable storage medium. By way of example, and not by way of limitation, FIG. 4 illustrates an example of a computer-readable storage medium 400. The storage medium contains computer-readable instructions stored in a format that can be retrieved interpreted by a computer processing device. By way of example, and not by way of limitation, the computer-readable storage medium 400 may be a computer-readable memory, such as random access memory (RAM) or read only memory (ROM), a computer readable storage disk for a fixed disk drive (e.g., a hard disk drive), or a removable disk drive. In addition, the computer-readable storage medium 400 may be a flash memory device, a computer-readable tape, a CD-ROM, a DVD-ROM, a Blu-ray, HD-DVD, UMD, or other optical storage medium.

The storage medium 400 contains speech recognition instructions 401 which include main processor thread instructions 402, first co-processor thread instructions 403, second co-processor thread instructions 404 and third co-processor thread instructions 405. The main processor thread instructions 402 may be configured to implement the first main processor thread 111 and second main processor thread 125 described above, when executed. The first co-processor thread instructions 403 may be configured to implement the functions described above with respect to the first co-processor thread code 113. The second co-processor thread instructions 403 may be configured to implement the functions described above with respect to the second co-processor thread code 115. The third co-processor thread instructions 405 may be configured to implement the functions described above with respect to the third co-processor thread code 117.

Embodiments of the present invention provide for fast and efficient speech recognition in a parallel processing environment. It is noted that the different software threads discussed above can be processed in parallel by the main processor unit and co-processor elements. Parallel processing software threads, as used herein, refers to execution of two or more threads in a manner that overlaps in time. Parallel processing is distinguished from serial processing, in which execution of one thread is completed before execution of another thread begins.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for".

What is claimed is:

1. A computer speech processing system, comprising:
a memory unit;
a main processing unit coupled to the memory unit;
one or more co-processor elements coupled to the memory unit and the main processing unit, wherein each of the one or more co-processor elements include a co-processor unit and a local memory associated with the co-processor unit;
a first main processor thread stored in the memory unit and configured for execution by the main processor, wherein the first main processor thread is configured to cause the main processor to perform memory maintenance and voice recognition result retrievals upon execution;
a first co-processor thread stored in the main memory or in one or more co-processor local memories and configured for execution by one or more of the co-processor units, wherein the first co-processor thread is configured to cause one or more of the co-processors to receive raw data representing sound detected by a microphone and perform voice detection and initial feature extraction on the raw data;
a second co-processor thread stored in the main memory or in one or more co-processor local memories and configured for execution by one or more of the co-processor units, wherein the second co-processor thread is configured to cause one or more of the co-processor elements to receive feature data derived for one or more features extracted by the first co-processor thread and information for locating probability density functions needed for probability computation by a speech recognition model and compute a probability that one or more features correspond to a known sub-unit of speech using the probability density functions and the feature data; and
a third co-processor thread stored in the main memory or in one or more co-processor local memories and configured for execution by one or more of the co-processor units, wherein the third co-processor thread is configured to cause one or more of the co-processor units to compute at least a portion of a path probability that a sequence of sub-units of speech correspond to a known speech unit.

2. The system of claim 1, wherein the second co-processor thread is further configured to receive code and data for retrieving a state and probability density in order to determine a most probable sub-unit of speech.

3. The system of claim 2 wherein the second co-processor thread is executed with two co-processor elements, wherein a first co-processor computes the probability and a second co-processor determines the most probable state.

4. The system of claim 1, wherein each local memory for each co-processor has sufficient memory available for the third co-processor thread to load all network probabilities for given network of speech sub-units for a given sub-unit probability.

5. The system of claim 1, wherein the third co-processor thread is configured to load data for a speech sub-unit associated with a node in a network plus links to one or more neighboring nodes into a local store of a third co-processor element along with a complete model structure for the node and all state probabilities for a corresponding model.

6. The system of claim 1, wherein the third co-processor thread is configured to compute one or more per node per frame portions of the path probability.

7. The system of claim 6, further comprising a second main processor thread configured to collect the per node per frame portions probabilities from the third co-processor thread and keep track of a history of the per-node-per-frame portions and determine the path probability from the history of the per-node-per-frame portions computed by the third co-processor thread.

8. The system of claim 1, wherein the third co-processor thread is configured to compute a complete per-frame path probability.

9. The system of claim 8, further comprising a second main processor thread configured to keep track of a history of the per-frame path probability computed by the third co-processor thread.

10. The system of claim 1 wherein the first main processor thread is further configured to receive the raw data and buffer the raw data for transfer to the first co-processor thread.

11. The system of claim 1, wherein the first main processor thread is further configured to finish feature extraction from initial feature extraction performed by the first co-processor thread.

12. A computer implemented method for speech processing in a computer speech apparatus having a main processing unit, a memory unit coupled to the main processing unit and one or more co-processors coupled to the memory unit and the main processing unit, wherein each co-processor element includes a co-processor unit and a local memory associated with the co-processor unit, the method comprising:
 a) performing memory maintenance and voice recognition result retrievals upon execution with a first main processor thread executed by the main processor;
 b) performing voice detection and initial feature extraction on the raw data with a first co-processor thread running on one or more of the co-processor elements;
 c) receiving feature data derived for one or more features extracted by the first co-processor thread and information for locating probability density functions needed for probability computation by a speech recognition model and computing a probability that the one or more features correspond to a known sub-unit of speech using the probability density functions and the feature data with a second co-processor thread configured to run on one or more of the co-processor elements; and
 d) computing at least a portion of a path probability that a sequence of sub-units of speech correspond to a known speech unit with a third co-processor thread configured to run on one or more of the co-processor elements.

13. The method of claim 12, wherein b) further includes retrieving a state and probability density in order to determine a most probable sub-unit of speech with the second co-processor thread.

14. The method of claim 13, wherein b) includes executing the second co-processor thread with two co-processors, wherein a first co-processor computes the probability and a second co-processor determines the most probable state.

15. The method of claim 12, the third co-processor thread loads all network probabilities for given network of speech sub-units for a given sub-unit probability into the local memories of one or more of the co-processor elements.

16. The method of claim 12, wherein d) includes loading all network probabilities for given network of speech sub-units for a given sub-unit probability into a local memory of one or more of the co-processor elements with the third co-processor thread.

17. The method of claim 12, wherein d) includes computing one or more per node per frame portions of the path probability with the third co-processor thread.

18. The method of claim 17, further comprising collecting the per node per frame portions from the third co-processor thread and keeping track of a history of the per-node-per-frame portions and determine the path probability from the history of the per-node-per-frame portions computed by the third co-processor thread with a second main processor thread.

19. The method of claim 12, wherein d) includes computing a complete per-frame path probability with the third co-processor thread.

20. The method of claim 19, further comprising keeping track of a history of the per-frame path probability computed by the third co-processor thread with a second main processor thread.

21. The method of claim 12, wherein a) further comprises receiving the raw data and buffering the raw data for transfer to the first co-processor thread with the first main processor thread.

22. The method of claim 12, wherein a) further comprises finishing feature extraction with the first main processor thread from an initial feature extraction performed by the first co-processor thread.

23. A computer apparatus for implementing computer speech processing in a computer speech processing apparatus having a main processing unit, a memory unit coupled to the main processing unit and one or more co-processors coupled to the memory unit and the main processing unit, wherein each co-processor element includes a co-processor unit and a local memory associated with the co-processor unit, the system comprising:
 a) means for performing memory maintenance and voice recognition result retrievals upon execution with a first main processor thread executed by the main processor;
 b) means for performing voice detection and initial feature extraction on the raw data with a first co-processor thread running on one or more of the co-processors;
 c) means for receiving feature data derived for one or more features extracted by the first co-processor thread and information for locating probability density functions needed for probability computation by a speech recognition model and computing a probability that the one or more features correspond to a known sub-unit of speech using the probability density functions and the feature data with a second co-processor thread configured to run on one or more of the co-processors; and d) means for computing at least a portion of a path probability that a sequence of sub-units of speech correspond to a known speech unit with a third co-processor thread configured to run on one or more of the co-processors.

24. A computer readable storage medium, having embodied therein computer readable instructions for implementing a computer speech processing method in a computer speech processing apparatus having a main processing unit, a memory unit coupled to the main processing unit and one or more co-processors coupled to the memory unit and the main processing unit, the method comprising:

a) performing memory maintenance and voice recognition result retrievals upon execution with a first main processor executed by the main processor;

b) performing voice detection and initial feature extraction on the raw data with a first co-processor thread running on one or more of the co-processors;

c) receiving feature data derived for one or more features extracted by the first co-processor thread and information for locating probability density functions needed for probability computation by a speech recognition model and computing a probability that the one or more features correspond to a known sub-unit of speech using the probability density functions and the feature data with a second co-processor thread configured to run on one or more of the co-processors; and d) computing at least a portion of a path probability that a sequence of sub-units of speech correspond to a known speech unit with a third co-processor thread configured to run on one or more of the co-processors.

* * * * *